(12) United States Patent
Fredercik et al.

(10) Patent No.: US 6,924,010 B2
(45) Date of Patent: Aug. 2, 2005

(54) LOW SOLUTION VISCOSITY CELLULOSE TRIACETATE AND ITS APPLICATIONS THEREOF

(75) Inventors: Tim Joseph Fredercik, Kingsport, TN (US); Darryl Aubrey Godfrey, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 83 days.

(21) Appl. No.: 10/434,324

(22) Filed: May 7, 2003

(65) Prior Publication Data

US 2003/0212171 A1 Nov. 13, 2003

Related U.S. Application Data

(60) Provisional application No. 60/379,148, filed on May 8, 2002.

(51) Int. Cl.$^7$ ................................................ C08K 5/09
(52) U.S. Cl. ....................... 428/1.5; 428/1.54; 536/58; 536/59; 536/69
(58) Field of Search ................................ 428/1.5, 1.54; 536/58, 59, 69

(56) References Cited

U.S. PATENT DOCUMENTS

| | | |
|---|---|---|
| 3,846,403 A | 11/1974 | Gibney et al. .............. 260/227 |
| 3,870,703 A | 3/1975 | Gibney et al. .............. 260/229 |
| H02083 H * | 10/2003 | Bogard et al. ............... 428/1.1 |
| 6,683,174 B1 * | 1/2004 | Ozaki et al. ................. 536/69 |
| 2003/0212171 A1 * | 11/2003 | Frederick et al. ........... 524/141 |

FOREIGN PATENT DOCUMENTS

| | | |
|---|---|---|
| EP | 0769500 A1 | 4/1997 |
| EP | 0952160 A1 | 10/1999 |
| EP | 1167391 A1 | 1/2002 |
| JP | 5-239101 | 9/1993 |
| JP | 9-40792 | 2/1997 |
| JP | 11-254594 | 9/1999 |
| JP | 11-292989 | 10/1999 |
| JP | 2000-154202 | 6/2000 |
| JP | 2001-129838 | 5/2001 |
| WO | WO 0172847 A1 | 4/2001 |

OTHER PUBLICATIONS

Carl J. Malm, et al., *Factors During the Making of Cellulose Acetate Which Influence False Viscosity*, Tappi, 629–636, vol. 46, No. 10 (1963).

J.L. Neal, *Factors Affecting the Solution Properties of Cellulose Acetate*, Journal of Applied Polymer Science, vol. 9, 947–961 (1965).

\* cited by examiner

*Primary Examiner*—D. Lawrence Tarazano
(74) *Attorney, Agent, or Firm*—Needle & Rosenberg, P.C.

(57) ABSTRACT

The invention relates to low solution viscosity cellulose triacetate and methods of making thereof. The invention also relates to films prepared from the low solution viscosity cellulose triacetate and articles containing the low solution viscosity cellulose triacetate.

30 Claims, No Drawings

US 6,924,010 B2

LOW SOLUTION VISCOSITY CELLULOSE TRIACETATE AND ITS APPLICATIONS THEREOF

CROSS REFERENCE TO RELATED APPLICATIONS

This application claims the benefit of U.S. provisional application Ser. No. 60/379,148, filed May 8, 2002. This application is hereby incorporated by this reference in its entirety for all of its teachings.

FIELD OF THE INVENTION

The invention relates to low solution viscosity cellulose triacetates and methods of making thereof. The invention also relates to films prepared from the low solution viscosity cellulose triacetate and articles containing the low solution viscosity cellulose triacetate.

BACKGROUND OF THE INVENTION

The presence of hemicellulose impurities such as xylan acetates, and to a lesser degree, glucomannan acetates, in cellulose triacetate (CTA) tends to increase the concentrated solution viscosity of the CTA. This effect in which one CTA exhibits a higher concentrated solution viscosity relative to another CTA of the same intrinsic viscosity (IV) is called the false viscosity effect. Properties such as tensile and tear strength are closely related to molecular weight distribution, which is reflected by IV rather than concentrated solution viscosity.

Cellulose triacetate films are used in various photographic or optical elements because they are tough and have flame retardant properties. Generally, cellulose triacetate film has wide acceptance as a photographic support material. Recently, cellulose triacetate film has been used in the manufacture of liquid crystal displays or LCDs due to the film having an optical isotropy. The cellulose triacetate film is used as a protective film of a polarizing plate or a color filter in the liquid crystal display device.

In the case of LCD devices with higher resolution and brightness, smaller pixel size will be needed. Birefringent particles in the CTA protective film scatter light and interfere with the image clarity. Therefore, there is a need for even lower levels of birefringent particles in the CTA film. A CTA with lower viscosity in film casting solutions can be filtered through smaller openings in the same time as can conventional CTAs. This allows production of higher quality film while minimizing production cost. There is also a need for a cellulose triacetate having sufficiently high strength, low false viscosity, and relatively low peeling resistance for use in optical devices that can be made less expensive relative to a cellulose triacetate made from cotton linters.

SUMMARY OF THE INVENTION

The invention relates to a cellulose triacetate having an average degree of acetyl substitution of from about 2.5 to about 3.0, an intrinsic viscosity of from about 1.6 to about 2.2 dl/g as measured in N-methylpyrrolidone at 65° C., and a solution viscosity as measured by ASTM D 1343-91/ intrinsic viscosity ratio less than or equal to about 22.

The invention also relates to films and articles comprising the cellulose triacetates of the invention.

The invention further relates to a method for making cellulose triacetate comprising
(a) contacting dissolving grade cellulose with an acetylating catalyst and acetylating solvent to produce a mixture, wherein the catalyst is uniformly distributed throughout the mixture, wherein the amount of acetylating catalyst is from 0.5 to 5 weight parts per 100 weight parts cellulose, to produce a cellulose activate; and
(b) reacting the cellulose activate with an acetylating agent in the presence of the acetylating catalyst and acetylating solvent.

The invention also relates to a method for making cellulose triacetate comprising
(a) contacting dissolving grade cellulose containing hemicellulose impurities with an acetylating catalyst and acetylating solvent for a sufficient amount of time to break down at least about 50% of the hemicellulose impurities, wherein the amount of acetylating catalyst is from 0.5 to 5 weight parts per 100 weight parts cellulose, to produce a cellulose activate; and
(b) reacting the cellulose activate with an acetylating agent in the presence of the acetylating catalyst and the acetylating solvent.

The invention also relates to cellulose triacetate products produced by the methods of the invention.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included herein.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds, reference to "a carrier" includes mixtures of two or more such carriers, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

A weight part of a component, unless specifically stated to the contrary, is based on the weight or mass of one component relative to the weight or mass of a second component. The weight or mass can be expressed in grams, pounds, or any other acceptable unit of mass.

Throughout this publication, where publications are referenced, the disclosures of these publications in their entireties are hereby incorporated by reference into this application in order to more fully describe the state of the art to which this invention pertains.

One aspect of the invention relates to low solution viscosity cellulose triacetate. In various embodiments, the cellulose triacetate has an intrinsic viscosity of from about 1.6 dl/g to about 2.2 dl/g, from about 1.7 dl/g to about 2.1 dl/g, or from about 1.8 dl/g to about 2.0 dl/g as measured in N-methylpyrrolidone at 65° C. The intrinsic viscosity of the cellulose triacetate can be determined using techniques known in the art. Specifically, as used herein in the present invention, the intrinsic viscosity for any of the cellulose triacetates of the invention is calculated using the following procedure. The cellulose triacetate is dried for one hour at 105° C., and then transferred to a dessicator for 30 minutes to cool. A solution of 0.500% by weight of the cellulose triacetate was prepared in N-methylpyrrolidone (NMP). The intrinsic viscosity of the solution is determined using a Viscotek Y501C viscometer at 65° C.

The cellulose triacetate generally has an average acetic acid content in the range of from about 58.0 to about 62.5% and, an acetyl degree of substitution in various embodiments of from about 2.5 to about 3.0, from about 2.6 to about 2.9, or from about 2.8 to about 2.9. Cellulose acetate having an acetic acid content of 58% or more is generally known to those skilled in the art as cellulose triacetate. As used herein, the term "acetic acid content" is defined as the percent weight ratio of acetic acid moiety combined to the cellulose. The acetic acid content can be calculated using techniques known in the art. Specifically, the acetic acid content is measured and calculated herein according to ASTM D 817-91, which is a procedure known in the art.

The cellulose triacetate generally has an average degree of polymerization (DP) in various embodiments in the range of from about 200 to about 500, from about 220 to about 400, or from about 300 to about 350. The intrinsic viscosity and degree of polymerization requirement has a significant effect on the cost and quality of the cellulose triacetate. In cellulose triacetate manufacturing, higher degrees of polymerization require lower reaction temperatures, longer reaction times and produce less material from a given size reactor per unit time. The higher degree of polymerization also tends to require lower catalyst levels. If the catalyst is not uniformly distributed on the cellulose, then lower catalyst levels can lead to a lower quality product as indicated by the presence of more insoluble material. In film casting, higher concentrated solution viscosity requires lower solids levels in the casting dope and more filtration equipment, which ultimately produces less material.

The cellulose triacetate of the present invention possesses intrinsic viscosities comparable to commercially available cellulose triacetates, but with lower concentrated solution viscosities. The presence of hemicellulose impurities such as xylan acetates, and to a lesser degree, glucomannan acetates, in cellulose tend to increase the concentrated solution viscosity of the resultant cellulose triacetate. As described above, this effect in which one cellulose triacetate may exhibit a higher concentrated solution viscosity relative to another cellulose triacetate of the same intrinsic viscosity is referred to as the false viscosity effect. One advantage of producing low solution viscosity cellulose triacetate is that the cellulose triacetate can be filtered through smaller openings in the same time as can conventional cellulose triacetates. This permits efficient filtration of undesirable particles present in the cellulose triacetate, which ultimately results in the production of a higher quality film while minimizing production cost.

The solution viscosity of the cellulose triacetate can be measured and calculated using techniques known in the art. Specifically, as used herein, the solution viscosity of any of the cellulose triacetates of the invention is measured by method ASTM D 1343-91, which is entitled "Viscosity of Cellulose Derivatives by Ball-Drop Method." The procedure involves adding 60.0 grams of cellulose triacetate and 340.0 grams of a mixture of 90.0% by weight methylene chloride/10.0% by weight ethanol to a 16-oz glass bottle. The cellulose triacetate is dissolved by shaking and tumbling until a uniform solution is obtained. The resulting dope is placed in a constant temperature bath at 25° C. for two hours. The bottle containing the dope is removed from the bath and placed in a laser beam viscometer where two successive balls of constant weight and size are dropped into the solution and the time for the balls to fall a distance of 2.25 inches is measured. An average of the two times is reported for the sample. The solution viscosity as referred to throughout the invention is expressed in seconds. In various embodiments, the ASTM D 1343-91 solution viscosity of the cellulose triacetates of the invention are from about 20 to about 100 seconds, from about 25 to about 80 seconds, or from about 30 seconds to about 60 seconds.

The solution viscosity can be expressed as a ratio of the solution viscosity of the cellulose triacetate as measured by ASTM D 1343-91/intrinsic viscosity of the cellulose triacetate. The ratio is calculated by dividing the value of the solution viscosity (seconds) by the intrinsic viscosity (dL/g) of the resultant cellulose triacetate. Although the units are not expressed in the ratio, the units are s-g/dL. In various embodiments, the ratio is less than or equal to 22, less than or equal to 18, or less than or equal to 14. In another embodiment, the lower limit of the ratio is about 9, 10, 11, 12, 13, 14, or 15, and the upper limit is about 12, 13, 14, 15, 16, 17, 18, 19, 20, 21, or 22, where any of the values of the lower limit can be used with any of the values of the upper limit. In another embodiment, the ratio is from about 9 to about 22.

In another embodiment, the cellulose triacetate has an average degree of acetyl substitution of about 2.8 to about 2.9, the intrinsic viscosity is from about 1.8 to about 2.0 dl/g, and the solution viscosity as measured by ASTM D 1343-91/intrinsic viscosity ratio is from about 12 to about 18.

The procedure for producing cellulose triacetate of the invention generally involves the following steps: (a) contacting dissolving grade cellulose with an acetylating catalyst and acetylating solvent, and (b) reacting the dissolving grade cellulose with an acetylating agent in the presence of the acetylating catalyst and acetylating solvent.

The term "dissolving grade cellulose" is a term commonly used in the art, and generally refers to highly purified cellulose. In one embodiment, the dissolving grade cellulose is derived from wood pulp, such as softwood (coniferous) trees or hardwood (deciduous) trees, or cotton linters.

Cellulose is a polymer of glucose, but various other polysaccharides, known as hemicelluloses, are present in the cotton linters and trees from which dissolving grade cellulose for the manufacture of cellulose acetates is derived. The amount of hemicellulose impurity present in the dissolving grade cellulose is generally 5% or less by weight of the cellulose. As used herein, the measurement of hemicellulose content involves total hydrolysis in strong mineral acid followed by secondary hydrolysis in dilute acid. Some decomposition of sugars like xylose and mannose to furfural and similar compounds may occur. The values reported are not corrected for decomposition, but the technique is consistent for all samples, both cellulose and CTA. The primary hydrolysis technique used involves exposing the sample to 72% by weight sulfuric acid for one hour at 30° C. The secondary hydrolysis technique utilizes diluting to 4% by weight and holding the sample for one hour at 120° C. The secondary hydrolysis step has been optimized for wood sugars. The solution is neutralized, filtered, and introduced into a liquid chromatograph containing a lead exchanged sulfonated styrene divinylbenzene column. Times to elution for the sample are compared to those of standard sugars, and the concentration of each sugar is determined from the area of its peak in the chromatogram. The lower detectable limits for xylose and mannose are about 0.5% by this technique.

The hemicellulose impurities include polymers of hexoses (mannose and galactose) and pentoses (xylose and arabinose). The molecular chains of hemicelluloses are much shorter than are those of cellulose. Of these, typically only xylan and glucomannan are present in dissolving grade pulps in sufficient quantity to be problematic. The presence of hemicellulose acetates in cellulose triacetate is undesirable, because they have different solubility parameters compared to cellulose triacetate.

The contacting step generally involves mixing, soaking or submersing the cellulose in the acetylating solvent and catalyst. After the contacting step, a cellulose activate is produced. The term "cellulose activate" is defined as the cellulose that has been contacted with the acetylating solvent and catalyst prior to the reacting step. The duration of the contacting step will also vary with respect to the amount of acetylating catalyst that is used.

In one embodiment, the acetylating solvent is acetic acid. In another embodiment, a co-solvent can be used in combination with the acetylating solvent. Examples of co-solvents include, but are not limited to, methylene chloride. The amount of acetylating solvent will vary depending upon the amount of cellulose that is used. Enough acetylating solvent should be used wet out the cellulose so that there is better distribution of the acetylating catalyst and agent throughout the cellulose.

The acetylating catalyst can be any compound that is used to esterify cellulose. Examples of acetylating catalyst include, but are not limited to, sulfuric acid and perchloric acid. The amount of acetylating catalyst that is used can vary depending the amount and purity of the cellulose. The amount of acetylating catalyst will vary depending upon the desired intrinsic viscosity of the resultant cellulose triacetate. In one embodiment, the amount of acetylating catalyst is from 5 to 10 weight parts per 100 weight parts cellulose.

Not wishing to be bound by theory, it is believed that during the contacting step, the acetylating solvent and the acetylating catalyst breakdown the hemicellulose impurities present in the cellulose. The term "break down" refers to the ability of the acetylating solvent and/or the acetylating catalyst to solubilize the hemicellulose impurity(s) without reducing the molecular weight (as reflected by intrinsic viscosity) of the cellulose below desirable levels. It is believed that the acetylating solvent and/or the acetylating catalyst reduces the molecular weight of the hemicellulose impurities, which ultimately increases the solubility of the impurities in the acetylating solvent. In various embodiments, the amount of breakdown of hemicellulose impurity after the contacting step is greater than about 50%, 60%, 75%, 80%, 85%, 90%, or 95%.

In a separate embodiment, it is also believed that it is advantageous that during the contacting step, the acetylating catalyst be uniformly distributed throughout the cellulose mixture. The term "uniformly distributed" refers to the acetylating catalyst either contacting and/or reacting with all or the majority of the cellulose chains. When the acetylating catalyst is uniformly distributed throughout the cellulose, the esterification of the cellulose in the reaction step (b) will be much more efficient as well as produce a cellulose triacetate with better physical properties (e.g., high molecular weight, low solution viscosity, fewer unreacted cellulose particles).

In another embodiment, it is also believed that by contacting the cellulose with lower amounts of acetylating catalyst relative to the amount of cellulose for a longer period of time will break down more hemicellulose impurities while not reducing the molecular weight of the cellulose below desirable levels. Generally, the hemicellulose impurities, which have a lower molecular weight compared to cellulose, are more reactive with the acetylating catalyst than the cellulose.

The reacting step (b) generally involves adding the acetylating agent to the mixture or slurry produced after the contacting step. A slight excess of acetylating agent on a mole basis is required in order to convert the cellulose to cellulose triacetate. Typically, the addition of the acetylating agent to the cellulose and the acetylating catalyst is exothermic; thus, it may be desirable to maintain the reaction at a particular temperature. If necessary, additional acetylating solvent and/or catalyst may be added. In one embodiment, the acetylating agent is acetic anhydride. In another embodiment, the acetylating agent is acetic anhydride, the acetylating solvent is acetic acid, and the acetylating catalyst is sulfuric acid. Preferably, the mixture of the cellulose, acetylating agent, acetylating catalyst, and acetylating solvent should be adequately mixed to ensure that the catalyst and agent are uniformly distributed throughout the cellulose.

The acetylating solvent dissolves the cellulose triacetate that is formed after the reacting step (b), producing a very viscous solution, referred to herein as the "dope." In one embodiment, after the dope is produced, the acetylating catalyst is neutralized, any unreacted acetylating agent is hydrolyzed, and the resultant cellulose triacetate is precipitated by adding the solution to water or a low concentration of acetylating solvent, so that the cellulose triacetate no longer remains in solution. After the precipitation step, the cellulose triacetate exists as a pellet, powder, or flakes.

The cellulose triacetates of the invention can be converted to films using techniques known in the art. The melt casting method includes heating the cellulose ester, which may optionally include a plasticizer, to form a melt, and extruding the melt to form a film.

In another embodiment, the film can be produced by a solvent casting method. In this embodiment, cellulose triacetate is dissolved in an appropriate solvent, such as a mixture of dichloromethane and methanol, in accordance with known techniques for preparing a solvent dope. For example, in the first stage of the dope formation, cellulose triacetate is gradually added to the solvent while stirring at room temperature. Cellulose triacetate is swelled with the solvent, but is not dissolved at this stage. The amount of cellulose triacetate is in the range of from about 10 to about 75 weight %, based on the amount of the mixture, from about 25 to about 55 weight %, and from about 25 to about 45 weight %. Optionally, other additives, described herein, may be added to the solvent dope.

At the next stage, the mixture is cooled to a temperature of $-100°$ C. to $-10°$ C., $-80°$ C. to $-10°$ C., $-50°$ C. to $-20°$ C., or $-50°$ C. to $-30°$ C. The mixture can be cooled in a dry ice/methanol bath ($-75°$ C.) or in a cooled diethylene glycol solution ($-30°$ to $-20°$ C.). At the cooling stage, the mixture of cellulose triacetate and the solvent generally solidify.

Subsequently, the mixture is warmed to a temperature of $0°$ C. to $50°$ C. to dissolve the cellulose triacetate in the solvent. The mixture can be warmed by keeping it at room temperature. The mixture can also be warmed in a bath. Ultimately, a dope is formed as a uniform solution. If cellulose triacetate is not sufficiently dissolved, the cooling and warming steps can be repeated. The dope is observed visually to determine whether cellulose triacetate is sufficiently dissolved or not.

The dope is cast onto a support, and the solvent is evaporated to form a film. Before casting the dope, the concentration of the cellulose acetate in the dope is adjusted so that the solids content of the dope is from about 10 to about 75 weight %. The surface of the support is preferably polished to give a mirror plane. A drum or a band is used as the support. The casting and drying stages of the solvent cast methods are well known to those skilled in the art. For example, to name just a few, such solvent casting methods are described in U.S. Pat. Nos. 2,336,310; 2,367,603; and 2,492,078, which are incorporated by reference in their entireties.

The support generally does not have a surface temperature greater than about 10° C. when the dope is cast on the support. After casting, the dope can be dried with air for a sufficient amount of time for the film to obtain a sufficient tensile strength to be removed from the support, desirably this is at least 2 seconds. The formed film is peeled off the support, and can be further dried with air to remove any solvent remaining in the film. The temperature of the air can be gradually elevated from 100° C. to 160° C. The time for casting and peeling can be adjusted as necessary for obtaining the desired film thickness. The cellulose acetate film can have a thickness in the range of from about 5 to 500 microns, preferably in the range of about 20 to about 200 microns, and most preferably in the range of about 35 to about 120 microns.

Optionally, other additives can be used to produce the film. In one embodiment, a plasticizer can be added to the cellulose acetate film to improve the mechanical strength of the film. The plasticizer has another function of shortening the time for the drying process. Phosphoric esters and carboxylic esters (such as phthalic esters and citric esters) can be used as the plasticizer. Examples of phosphoric esters include, but are not limited to, triphenyl phosphate (TPP) and tricresyl phosphate (TCP). Examples of the phthalic esters include, but are not limited to, dimethyl phthalate (DMP), diethyl phthalate (DEP), dibutyl phthatate (DBP), dioctyl phthalate (DOP) and diethylhexyl phthalate (DEHP). Examples of the citric esters include, but are not limited to, O-acetyltriethyl citrate (OACTE) and O-acetyltributyl citrate (OACTB). Examples of other carboxylic esters include, but are not limited to, butyl oleate, methylacetyl ricinoleate, di-butyl sebacate and various trimellitic esters. Other plasticizers include 2,2'-methylenebis(4,6-di-t-butylphenyl) sodium phosphate, bis(4-t-butylphenyl) sodium phosphate, bis(p-methylbenzilidene)sorbitol, and bis(p-ethylvindilidene)-sorbitol.

In another embodiment, deterioration inhibitors including, but not limited to, peroxide decomposers, radical inhibitors, metal inactivating agent, or oxygen scavengers or ultraviolet inhibitors can also be incorporated into the cellulose triacetate films.

In the case of solvent casting, because the cellulose triacetates of the invention have a lower solution viscosity, the film casting solution can be filtered through smaller openings in the same time as can conventional cellulose triacetates. In one example, when cellulose derived from wood pulp that contains 1.3% xylose and 1.5% mannose is converted to a cellulose triacetate of the invention, in one embodiment, 0.6% xylose and 0.5% mannose is present in the resultant cellulose triacetate. This allows the production of higher quality film while minimizing production costs. Additionally, the cellulose triacetates of the invention can be cast at a higher solids content than prior art cellulose triacetates and allows more film to be produced at a given time, which is another advantage of the invention.

The films comprising the cellulose triacetates of the invention can be used in numerous articles. In one embodiment, the article includes, but is not limited to, a liquid crystal display device, organic light emitting diode device, or an optical display and storage device. Typically, the cellulose triacetates of the invention have a transmittance of from 93 to 94%, which is useful in these in these types of articles.

In one embodiment, a film comprising a cellulose acetate of the invention is applied to a liquid crystal display device. Generally, a liquid crystal display device includes an electrode disposed in each pixel for orienting the position of the liquid crystal molecules of a liquid crystal sealed in the device. The liquid crystal controls transmission of light there according to the voltage generated by the electrodes in the pixels. In such a conventional liquid crystal device, an active type thin film transistor is used. This conventional TFT LCD (Thin Film Transistor Liquid Crystal Display) device includes TFT's and pixel electrodes arranged on a TFT panel or bottom plate, a color filter for displaying color, a common electrode which is disposed on a color filter panel or top plate, a liquid crystal (LC) injected between the top and bottom plates, and a pair of polarizers disposed on the outer surfaces of the top and bottom places for selectively transmitting light. Cellulose triacetate (CTA) protective film is a part of polarizer assembly. In the above conventional LCD, the device is designed to transmit only light that passes through the pixel electrodes and color filter and to cut off any other light. To do so, the conventional LCD device uses a light-shielding layer (black matrix) formed in the color filter panel (top plate). However, in such cases, it is necessary to provide the black matrix formed on the top plate with extra margins to properly cover the TFT areas on the bottom plate. As a result, a larger black matrix occupying more space is required. This decreases the aperture ratio of the device.

The development of liquid crystal displays (LCD) as viable alternatives to cathode ray tubes over the past several years has resulted in an additional application for solvent-cast cellulose triacetate optical film. Cellulose triacetate film is used to protect the polarizing films used in the display. The critical performance characteristics for a film material to perform this function are essentially the same as for the photofilm base application. Information displays such as the cathode ray tube (CRT) and liquid crystal display (LCD) function by controlling which regions of the display are light and which are dark to convey useful information to the user. LCDs are "passive" displays, merely controlling transmission of externally generated light through the display. Some source of external light is necessary for a passive display to function, either light from a source behind the cell or ambient light reflected from a mirror surface at the back of the cell. In those regions designated to be bright, light is permitted to transmit. In contrast, light is prevented from transmitting by the display for regions designated to be dark.

Twisted nematic and super twisted nematic liquid crystal display modes require the use of crossed polarizers to function. Additional layers, such as optical compensation films and color filters may also be included in the display construction. In the simplest configuration, the cell containing the liquid crystal is placed between the crossed polarizers. Light transmission is determined by controlling the optical activity of the liquid crystal to rotate the polarization of the incident light to permit passage through the cell. Operating in transmission mode with a backlight as the source of illumination, the unpolarized incident light falls on a polarizing sheet that passes only light polarized perpendicular to the molecular orientation of the dichroic dye in the polarizing sheet. This plane polarized light then falls on the liquid crystal cell wherein the director twists (90° for a twisted nematic and 270° for a supertwisted nematic) from one surface to the other.

The twist in the director is created by the construction of the cell. Alignment layers (such as rubbed polyimide) on the inside cell surface establish the alignment of the first molecular layer, and the top and bottom alignments are perpendicular to each other. An amount of chiral nematic liquid crystal is typically added to the cell to ensure that the director twist is only in one direction throughout the cell. Cell thickness and uniformity of thickness also must be very well controlled.

The light polarization within the cell follows the twisting director, emerging from the liquid crystal cell with a plane polarization perpendicular to the plane of polarization selected by the first polarizer. The second polarizer, oriented flat against the cell but such that the polymer molecular direction is perpendicular to that in the first polarizing sheet, allows this polarized light to pass, and this area is thus bright. When a sufficiently high voltage is applied across the LC cell via transparent electrodes on the glass surface, the twist in the liquid crystal director is disrupted. The polarization plane of the light is therefore not rotated 90° upon traversing the cell. Thus, the light emerging through the top surface of the liquid crystal cell is polarized perpendicular to that required for transmission by the top polarizer and is therefore absorbed, resulting in a dark area in the cell. By controlling which areas transmit light and which areas block light transmission, the LCD conveys information to the user.

Polarizers used in LCDs typically consist of polyvinyl alcohol treated with a dichroic dye and/or iodine and stretched uniaxially to orient the molecules. Since polyvinyl alcohol is sensitive to water and is also easily scratched, PVA polarizing films are usually protected by sheets of optically isotropic, highly transparent plastic, most typically solvent-cast cellulose triacetate films. Polyesters and polycarbonates have also been used, but these materials tend to crystallize resulting in birefringence (i.e., optical anisotropy or glowing) limiting their utility in this application. Cellulose triacetate is also preferred because of its ability to adhere very strongly to the PVA polarizing sheet.

A major difference between the photofilm and LCD applications is the level of pinpoint fibers (unreacted or undereacted cellulose mostly) that can be tolerated. When polarized light strikes these pinpoint fibers, they glow brightly (birefringence). Such "glittering points" detract from the sharpness of the display. A solution of the cellulose triacetate in solvents used to cast film (such as a mixture of methylene chloride and methanol) is filtered through openings about 10–15 microns in size to remove the larger particles. These openings are typically about half the size of a pixel on the screen. As pixel size is reduced to provide higher resolution displays, the filter openings must also be reduced in size. Film makers demand cellulose triacetate in which pinpoint fibers less than about 30 microns in size have been minimized. As display resolution is increased and displays are made brighter, the amount of glittering points that can be tolerated is further reduced.

Cellulose triacetate of the invention can also be used in various photographic or optical elements, because it is durable and it possesses flame retardant properties. It is known in the art that cellulose triacetate is used as a photographic support material. For example, U.S. Pat. Nos. 3,705,148 and 3,718,728 describe methods for improving the resistance to distortion and shrinkage of a cellulose triacetate film when exposed to very high temperatures.

EXAMPLES

The following Examples are set forth so as to provide those of ordinary skill in the art with a complete disclosure and description of how the compounds, articles, and methods claimed herein are made, performed and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be taken into account. Unless indicated otherwise, parts are parts by weight, temperature is in ° C. or is at room temperature, and pressure is at or near atmospheric.

Example 1

Dissolving grade softwood pulp was treated by adding a solution of 0.0091 parts sulfuric acid and 0.91 parts by weight acetic acid per part cellulose and soaked for 120 minutes. Acetic anhydride along with additional acetic acid and sulfuric acid were added to bring the total amount to 5.4 parts acetic acid per part by weight oven-dry cellulose, 3.0 parts of chilled acetic anhydride and 0.0604 parts sulfuric acid. The exotherm was moderated by a cooling jacket to dope out at 40° C. A magnesium acetate solution was added to neutralize remaining acetic anhydride and sulfuric acid. The solution was ripened at 80° C. for six hours, then precipitated in water, washed with water and dried. Viscosity of the product in ASTM-D 1343-91 is 17.5 seconds while the intrinsic viscosity in NMP was 1.842 for a ratio of 9.5, which is derived from 17.5 divided by 1.842).

Comparative Example

Dissolving-grade softwood pulp was treated with a solution of 0.032 parts sulfuric acid and 0.90 parts by weight acetic acid per part cellulose and soaked for 15 minutes. Acetic anhydride along with additional acetic acid and sulfuric acid were added to bring the total amount to 5.4 parts acetic acid per part by weight oven-dry cellulose, 3.0 parts of chilled acetic anhydride and 0.0604 parts sulfuric acid. The exotherm was moderated by a cooling jacket to dope out at 40° C. A magnesium acetate solution was added to neutralize remaining acetic anhydride and sulfuric acid. The solution was ripened at 80° C. for six hours, then precipitated in water, washed with water and dried. Viscosity of the product in ASTM-D 1343-91 was 49.1 seconds while the intrinsic viscosity in NMP was 1.716 for a ratio of 28.6.

Example 2

A comparison of commercially available cellulose triacetates from various manufacturers (I–IV and VII–IX) to two cellulose triacetates of the present invention (V and VI) are shown in Table 1. The data in Table 1 demonstrate the significantly lower concentrated solution viscosity of cellulose triacetate of the invention versus conventional cellulose triacetate made from cotton linters or wood pulp. For example, as shown in Table 1, a cellulose triacetate of the invention (VI) has an ASTM viscosity/IV ratio of 15.8 (IV=1.91), when compared to prior art cellulose triacetate IX having a similar intrinsic viscosity (IV=1.90), which has a higher ratio of 26.6. In summary, all of the prior art cellulose triacetates have a substantially higher ASTM viscosity/IV ratio when compared to the cellulose triacetate of the invention.

TABLE 1

| CTA # | I | II | III | IV | V | VI | VII | VIII | IX |
|---|---|---|---|---|---|---|---|---|---|
| Pulp Source | linters | linters | linters | linters | linters | softwood | softwood | linters | linters |
| Molecular Wt. Distribution | | | | | | | | | |
| Mn | 84,492 | 98,210 | 76,458 | 66,003 | 72,937 | 78,783 | 111,507 | 77,007 | |
| Mw | 395,071 | 388,640 | 408,029 | 403,539 | 376,204 | 357,043 | 357,043 | 398,362 | |
| Mz | 939,795 | 897,179 | 1,134,488 | 1,102,24 | 922,012 | 790,872 | 741,439 | 1,008,904 | |
| Polydispersity | 4.68 | 3.96 | 5.34 | 6.11 | 5.16 | 4.53 | 3.32 | 5.17 | |
| IV (dL/g) | 2.01 | 2.05 | 1.94 | 1.86 | 1.98 | 1.91 | 2.02 | 2.09 | 1.90 |
| ASTM D1343-91 Viscosity (seconds) | 61.8 | 59.4 | 45.5 | 46.6 | 44.4 | 30.2 | 72.7 | 69.2 | 50.5 |
| Ratio ASTM Visc./IV | 30.7 | 29.0 | 23.5 | 25.1 | 22.4 | 15.8 | 36.0 | 33.1 | 26.6 |
| % Acetic Acid Content | 60.9 | 61.2 | 61.1 | 61.1 | 61.1 | 60.8 | 60.8 | 60.9 | 60.7 |
| Degree of Acetyl Substitution | 2.87 | 2.89 | 2.88 | 2.88 | 2.88 | 2.86 | 2.86 | 2.86 | 2.85 |

Example 3

Two samples of cellulose triacetate were prepared from the same softwood pulp for evaluation of the resulting film casting solution. Sample 1, which is not a cellulose triacetate of the invention, had an IV of 2.26, an ASTM D 1343-91 viscosity of 116 seconds, and an ASTM viscosity/IV ratio of 51.3. Sample 2, which is a cellulose triacetate of the invention, had an IV of 2.22, an ASTM D 1343-91 viscosity 22.7 seconds, and an ASTM viscosity/IV ratio of 10.2. Both samples were dissolved in a solution of 84% methylene chloride and 16% methanol, and the clarity of each solution was analyzed. Sample 1 had a haze of 20.4%. Sample 2 had a haze of 7.6%, indicating a significant reduction in the amount of small particles.

The invention has been described in detail with particular reference to preferred embodiments thereof, but it will be understood that variations and modifications/can be affected without departing from the scope and spirit of the invention.

What is claimed is:

1. A cellulose triacetate having an average degree of acetyl substitution of from about 2.5 to about 3.0, an intrinsic viscosity of from about 1.6 to about 2.2 dl/g as measured in N-methylpyrrolidone at 65° C., and a solution viscosity as measure by ASTM D 1343-91/intrinsic viscosity ratio less than or equal to about 22.

2. The cellulose triacetate of claim 1, wherein the ratio is less than or equal to 18.

3. The cellulose triacetate of claim 1, wherein the ratio is less than or equal to 14.

4. The cellulose triacetate of claim 1, wherein the ratio is from 9 to 22.

5. The cellulose triacetate of claim 1, wherein the intrinsic viscosity is from 1.7 to 2.1 dl/g.

6. The cellulose triacetate of claim 1, wherein the intrinsic viscosity is from 1.8 to 2.0 dl/g.

7. The cellulose triacetate of claim 1, wherein the average degree of acetyl substitution of from 2.6 to 2.9.

8. The cellulose triacetate of claim 1, wherein the average degree of acetyl substitution of from 2.8 to 2.9.

9. The cellulose triacetate of claim 1, wherein the average degree of acetyl substitution is from 2.8 to 2.9, the intrinsic viscosity is from 1.8 to 2.0 dl/g, and the solution viscosity as measured by ASTM D 1343-91/intrinsic viscosity ratio is from 12 to 18.

10. A film comprising the cellulose triacetate of claim 1.

11. The film of claim 10, wherein the film further comprises a plasticizer.

12. The film of claim 10, wherein the film has a thickness of from 5 μm to 500 μm.

13. The film of claim 10, wherein the film is a solvent cast film.

14. An article comprising the film of claim 10.

15. The article of claim 14, wherein the article is an optical display device.

16. The article of claim 14, wherein the article is a liquid crystal display device.

17. The article of claim 14, wherein the article is a protective film of a liquid crystal display device.

18. The article of claim 14, wherein the article is a photographic film.

19. The cellulose triacetate of claim 1, wherein the solution viscosity as measured by ASTM D 1343-91/ intrinsic viscosity ratio is less than or equal to about 20.

20. The cellulose triacetate of claim 1, wherein the solution viscosity as measured by ASTM D 1343-91/ intrinsic viscosity ratio is less than or equal to about 16.

21. A method for making the cellulose triacetate of claim 1, comprising
   (a) contacting dissolving grade cellulose with an acetylating catalyst and acetylating solvent to produce a mixture, wherein the catalyst is uniformly distributed throughout the mixture, wherein the amount of acetylating catalyst is from 0.5 to 5 weight parts per 100 weight parts cellulose, to produce a cellulose activate; and
   (b) reacting the cellulose activate with an acetylating agent in the presence of the acetylating catalyst and acetylating solvent,
thereby producing a cellulose acetate having a solution viscosity as measured by ASTM D 1343-91/intrinsic ratio less than or equal to about 22.

22. The method of claim 21, wherein when the dissolving grade cellulose contains hemicellulose impurities, the dissolving grade cellulose is contacted with an acetylating catalyst and acetylating solvent during step (a) for a sufficient amount of time to break down at least about 50% of the hemicellulose impurities.

23. The method of claim 21, wherein the dissolving grade cellulose is from cotton linters.

24. A method for making the cellulose triacetate of claim 1, comprising
  (a) contacting dissolving grade cellulose containing hemicellulose impurities with an acetylating catalyst and acetylating solvent for a sufficient amount of time to break down at least about 50% of the hemicellulose impurities, wherein the amount of acetylating catalyst is from 0.5 to 5 weight parts per 100 weight parts cellulose, to produce a cellulose activate; and
  (b) reacting the cellulose activate with an acetylating agent in the presence of the acetylating catalyst and the acetylating solvent,
thereby producing a cellulose acetate having a solution viscosity as measured by ASTM D 1343-91/intrinsic ratio less than or equal to about 22.

25. The method of claim 24, wherein the dissolving grade cellulose is from wood pulp.

26. The method of claim 25, wherein the acetylating agent is acetic anhydride and the acetylating solvent is acetic acid.

27. The method of claim 26, wherein the acetylating catalyst is sulfuric acid.

28. The method of claim 25, wherein in step (a), the amount of breakdown of hemicellulose impurity after the contacting step is greater than 75%.

29. The cellulose triacetate product produced by the process comprising
  (a) contacting dissolving grade cellulose with an acetylating catalyst and acetylating solvent to produce a mixture, wherein the catalyst is uniformly distributed throughout the mixture, wherein the amount of acetylating catalyst is from 0.5 to 5 weight parts per 100 weight parts cellulose, to produce a cellulose activate; and
  (b) reacting the cellulose activate with an acetylating agent in the presence of the acetylating catalyst and acetylating solvent,
thereby producing a cellulose acetate having a solution viscosity as measured by ASTM D 1343-91/intrinsic ratio less than or equal to about 22.

30. The cellulose triacetate product produced by the process comprising
  (a) contacting dissolving grade cellulose containing hemicellulose impurities with an acetylating catalyst and acetylating solvent for a sufficient amount of time to break down at least about 50% of the hemicellulose impurities, wherein the amount of acetylating catalyst is from 0.5 to 5 weight parts per 100 weight parts cellulose, to produce a cellulose activate; and
  (b) reacting the cellulose activate produced in step (a) with an acetylating agent in the presence of the acetylating catalyst and the acetylating solvent,
thereby producing a cellulose acetate having a solution viscosity as measured by ASTM D 1343-91/intrinsic ratio less than or equal to about 22.

* * * * *

UNITED STATES PATENT AND TRADEMARK OFFICE
CERTIFICATE OF CORRECTION

PATENT NO.    : 6,924,010 B2
DATED         : August 2, 2005
INVENTOR(S)   : Frederick et al.

It is certified that error appears in the above-identified patent and that said Letters Patent is hereby corrected as shown below:

<u>Title page,</u>
Item [75], Inventors, change "Tim Joseph Fredercik, Kingsport, TN (US); Darryl Aubrey Godfrey, Gray TN (US)" to read -- Timothy Joseph Frederick, Kingsport, TN (US); Darryl Aubrey Godfrey, Gray TN (US) --.

Signed and Sealed this

Thirteenth Day of September, 2005

JON W. DUDAS
*Director of the United States Patent and Trademark Office*